United States Patent
Grout et al.

(10) Patent No.: US 12,495,075 B2
(45) Date of Patent: Dec. 9, 2025

(54) USING CATEGORIZATION TAGS FOR RULE GENERATION AND UPDATE IN A RULES-BASED SECURITY SYSTEM

(71) Applicant: International Business Machines Corporation, Armonk, NY (US)

(72) Inventors: Juliet Grout, Evesham (GB); Saritha Arunkumar, Woodley (GB); Seema Nagar, Bangalore (IN); Ilgen Banu Yuceer, London (GB)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 18/107,729

(22) Filed: Feb. 9, 2023

(65) Prior Publication Data
US 2024/0275817 A1    Aug. 15, 2024

(51) Int. Cl.
*H04L 9/40* (2022.01)
*G06F 16/28* (2019.01)

(52) U.S. Cl.
CPC ............ *H04L 63/20* (2013.01); *G06F 16/285* (2019.01); *H04L 63/1425* (2013.01)

(58) Field of Classification Search
CPC ... H04L 63/20; H04L 63/1425; H04L 63/205; H04L 63/302; H04L 63/304; H04L 63/145; H04L 63/1466; G06F 16/285
USPC ........................................ 709/220, 224–228
See application file for complete search history.

(56) References Cited

U.S. PATENT DOCUMENTS

| | | | |
|---|---|---|---|
| 9,503,472 B2 | 11/2016 | Laidlaw et al. | |
| 9,712,554 B2 | 7/2017 | Hassanzadeh et al. | |
| 10,402,589 B1 * | 9/2019 | Madisetti | G06F 21/6218 |
| 10,673,880 B1 * | 6/2020 | Pratt | H04L 63/1425 |

(Continued)

FOREIGN PATENT DOCUMENTS

| | | | | |
|---|---|---|---|---|
| CA | 2611050 A1 * | 12/2006 | | G06F 11/0748 |
| CA | 3038728 A1 * | 4/2018 | | G06Q 20/20 |

(Continued)

OTHER PUBLICATIONS

Yoder, "Automating Mapping to ATT&CK: The Threat Report ATT&CK Mapper (TRAM) Tool," MITRE Attack, Dec. 20, 2019, https://medium.com/mitre-attack/automating-mapping-to-attack-tram-1bb1b44bda76.

(Continued)

*Primary Examiner* — Khanh Q Dinh
(74) *Attorney, Agent, or Firm* — Jeffrey M. Ingalls

(57) ABSTRACT

A technique for classifying and handling threat data in a rules-based security system. For each rule in the set, a set of one or more first tags are generated. The tags categorize the rule according to a hierarchical scheme. In response to receipt of a new threat, the system automatically determines whether the existing set of rules provide an acceptable coverage for the new threat. This determination is made by generating a set of one or more second tags that categorize the new threat, and then comparing the set of one or more second tags with the set of one or more first tags according to given match criteria. Upon a determination that the set of rules do not provide an adequate coverage for the new threat, a recommendation is output from the system. The rules-based security system is then adjusted according to the recommendation for subsequent handling of the new threat.

20 Claims, 7 Drawing Sheets

(56) References Cited

U.S. PATENT DOCUMENTS

| | | | |
|---|---|---|---|
| 11,012,472 B2 | 5/2021 | Milazzo et al. | |
| 11,036,867 B2 | 6/2021 | Bhatia et al. | |
| 11,290,483 B1 | 3/2022 | Kannan et al. | |
| 11,431,734 B2 | 8/2022 | Seul et al. | |
| 2013/0004948 A1* | 1/2013 | Milgrew | G01N 27/27 |
| | | | 435/6.1 |
| 2018/0004948 A1* | 1/2018 | Martin | H04L 63/1425 |
| 2020/0296124 A1* | 9/2020 | Pratt | H04L 63/20 |
| 2020/0379868 A1* | 12/2020 | Dherange | G06N 20/20 |
| 2020/0382536 A1* | 12/2020 | Dherange | H04L 63/1425 |
| 2021/0081366 A1* | 3/2021 | Madisetti | G06F 40/289 |
| 2023/0171273 A1* | 6/2023 | Vaidya | H04L 63/101 |
| | | | 726/23 |
| 2024/0275817 A1* | 8/2024 | Grout | H04L 63/1425 |
| 2024/0286443 A1* | 8/2024 | Signorelli | B60C 25/0536 |

FOREIGN PATENT DOCUMENTS

| | | | | |
|---|---|---|---|---|
| CA | 3024255 C | * | 3/2023 | G06N 3/04 |
| CA | 3135792 C | * | 5/2023 | G06N 20/20 |

OTHER PUBLICATIONS

"Scheduled Task/Job: At", Retrieved from: https://attack.mitre.org/techniques/T1053/002/, 2022, 2 pages.

"Scheduled Task/Job: Scheduled Task", Retrieved from: https://attack.mitre.org/techniques/T1053/005/ , 2022, 8 pages.

* cited by examiner

USING CATEGORIZATION TAGS FOR RULE GENERATION AND UPDATE IN A RULES-BASED SECURITY SYSTEM

BACKGROUND OF THE INVENTION

Technical Field

This disclosure relates generally to security system alert handling.

Background of the Related Art

Security Information and Event Management (SIEM) and External Detection and Response (XDR) are well-known enterprise security solutions.

SIEM tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures.

XDR is software designed to automatically protect an organization's end users, endpoint devices and IT assets against cyberthreats that get past antivirus software and other traditional endpoint security tools. Typically, it is deployed by a service provider as a managed service on behalf of an enterprise customer. XDR collects data continuously from all endpoints on the customer network—desktop and laptop computers, servers, mobile devices, IoT (Internet of Things) devices and more. It analyzes this data in real time for evidence of known or suspected cyberthreats, and it can respond automatically to prevent or minimize damage from threats it identifies. XDR threat detection analytics and automated response capabilities can identify and contain potential threats that penetrate the network perimeter before they can do serious damage, and these capabilities often do not require human intervention. XDR also provides tools that security teams can use to discover, investigate and prevent suspected and emerging threats on their own.

Both SIEM and XDR are rule-based systems. A rule (also referred to as a correlation rule) are constructs that are applied to events, flows or offenses, to search for or detect anomalies. If all of the conditions are a rule are met, the rule generates a response that the solution (or some other security system or device) can then act upon.

While SIEM/XDR technologies provide significant advantages, the rule-based nature of the solution means that the systems are not easily adapted to newly-identified attacks or threats. When a new threat is discovered, there needs to be a quick method for a security operations team to establish if the logs that are sent to SIEM or XDR and the alerting that is in place for their SIEM/XDR offers adequate coverage to detect if the new threat is being exploited. If it is established that the coverage offered by the SIEM/XDR is not adequate, then the security operations team need to quickly understand what steps they could take to improve the SIEM/XDR coverage/alerting. Currently, however, there are no good solutions available for this problem. As a result, whenever a new threat is discovered, SecOps teams scramble to locate design documents, architecture and network diagrams, and are forced to review manually potentially thousands of detection rules (often poorly-documented) as well as change records, where tuning is often documented. With this mass of disparate source material, it is very difficult to find all the information that is necessary to enable the teams to determine how to handle the new threat. Indeed, even if the relevant documentation can be located, those documents, as well as the existing rules, often are outdated and do not accurately describe the detection/protection in place. A further problem is that the wider security team need to understand the traceability and the context of why a given SIEM/XDR rule was introduced and tuned. This is often due to non-functional requirements that are specified in a design document, or that arose due to adjustments to detect newer attack methods. That said, the traceability back to the initial requirement and further adjustments are often lost in business/audit operations, further compounding the problem of how best to determine how best to respond to the new attack or threat.

BRIEF SUMMARY

This disclosure provides for a method, apparatus and computer program product for classifying and handling threat data in a rules-based security system that applies a set of rules to search for and detect anomalies. Representative rules-based security systems include SIEM, and an XDR. In this approach, and for each of one or more rules in the set of rules, a set of one or more first tags are generated. The tags categorize the rule, preferably according to a hierarchical scheme. Typically, the tag generation for the existing rules is carried out in an off-line process by using a supervised Natural Language Processing (NLP) multi-label classifier that has been trained on rule documentation (e.g., rule statements and notes). In response to receipt of a new threat, the system automatically determines whether the existing set of rules provide an acceptable coverage for the new threat. This determination is made by using the multi-label classifier to generate a set of one or more second tags that categorize the new threat, and then comparing the set of one or more second tags with the set of one or more first tags according to given match criteria. Based on a comparison of the set of one or more second tags with the set of one or more first tags, a recommendation is output from the system. The nature of the recommendation may vary but may include one or more of: maintain the current rule set without change (e.g., because the system already recognizes the threat, or because the existing set of rules already provide coverage sufficient coverage), an identification of a list of groups of the set of rules that should be combined to increase the percent coverage, identification of a new rule, identification of an update to an existing rule, and the like. The rules-based security system is then adjusted according to the recommendation for subsequent handling of the new threat.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
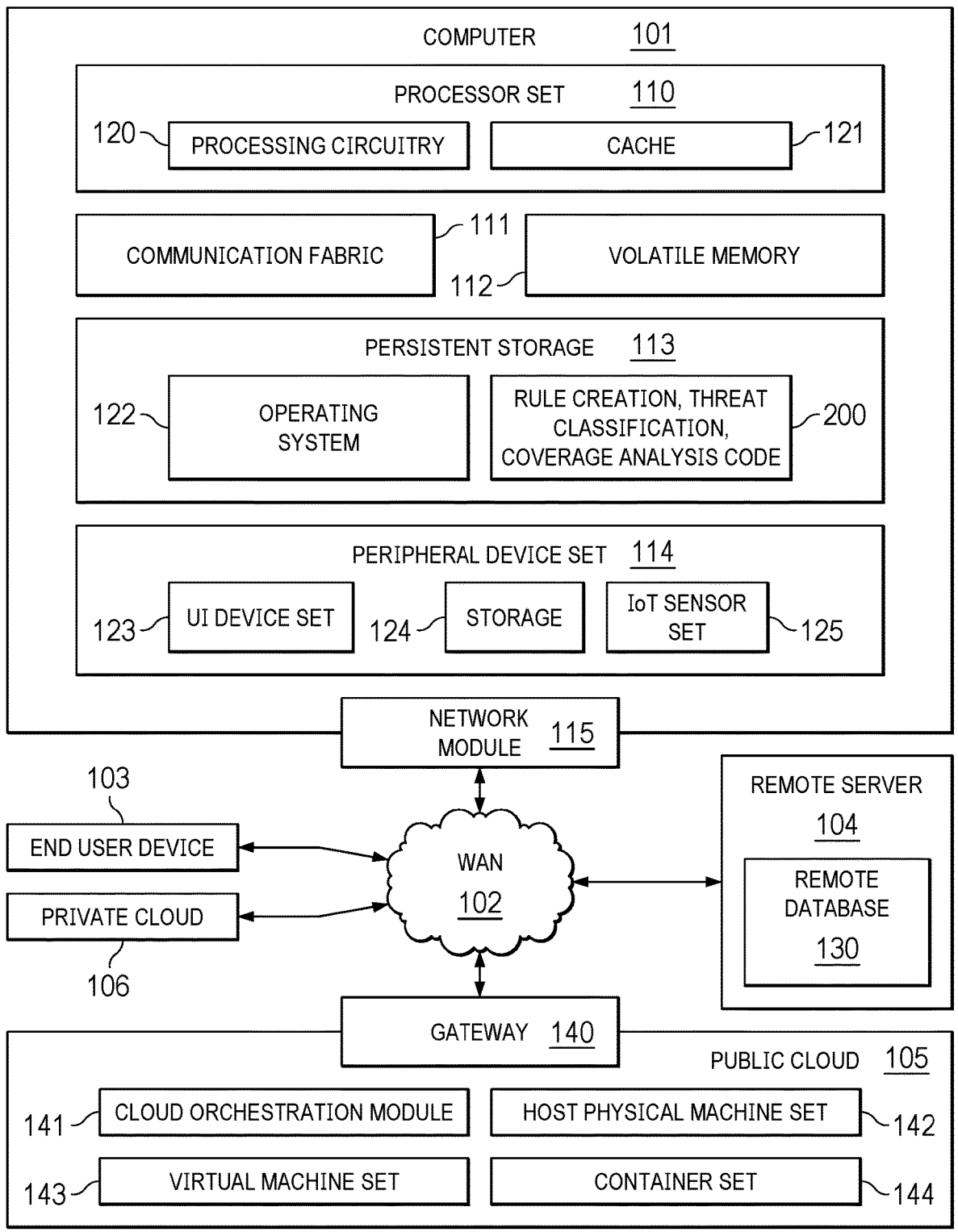
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the rule creation, threat classification, coverage analysis and recommendations code 200 of this disclosure, which are described in detail below. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Security Intelligence Platform with Incident Forensics

Figure 2:
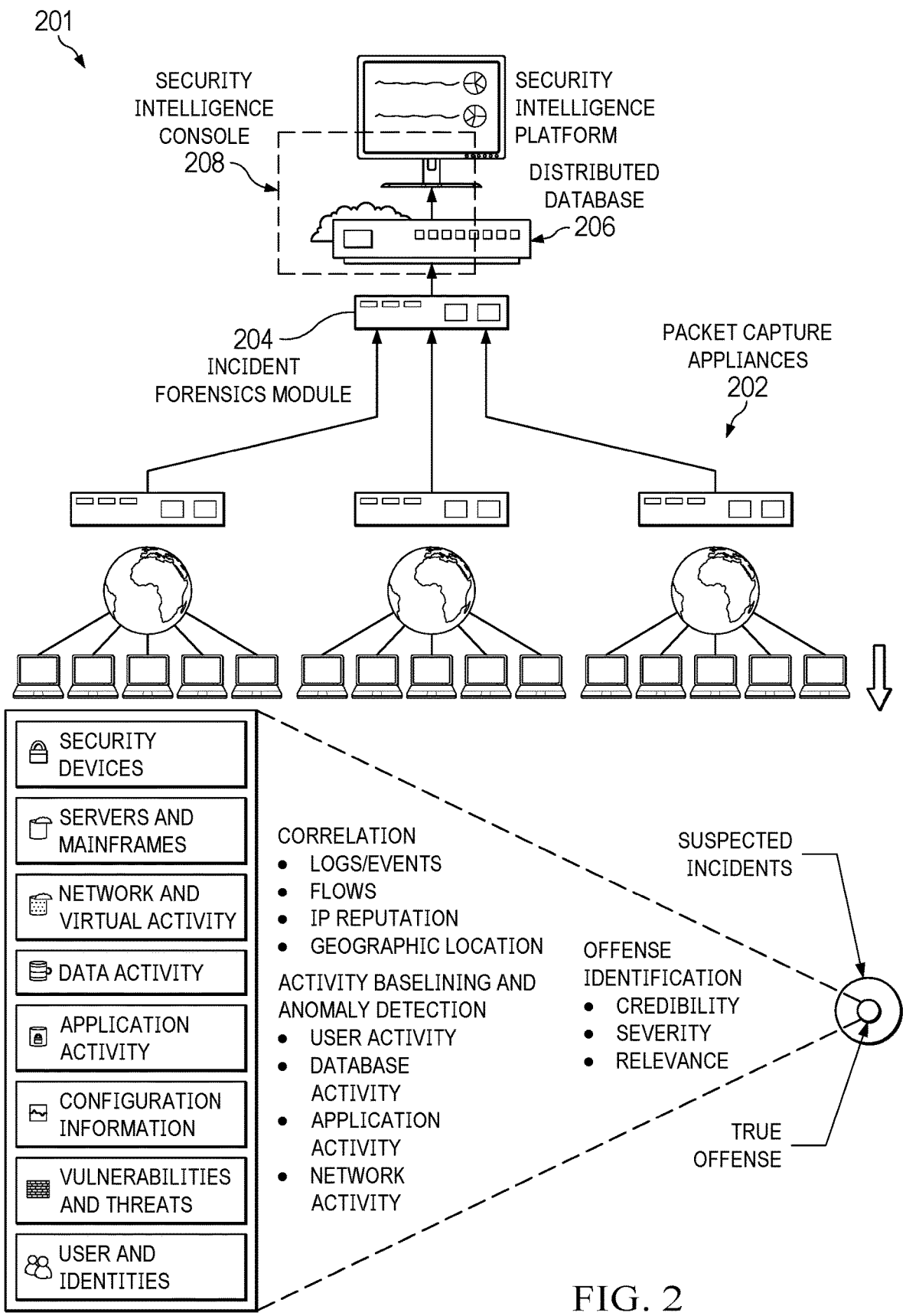
FIG. 2 depicts a representative SIEM system in which the techniques of this disclosure may be implemented.

A known type of security intelligence platform is illustrated in FIG. 2. Generally, the platform provides search-driven data exploration, session reconstruction, and forensics intelligence to assist security incident investigations. In pertinent part, the platform 201 comprises a set of packet capture appliances 202, an incident forensics module appliance 204, a distributed database 206, and a security intelligence console 208. The packet capture and module appliances are configured as network appliances, or they may be configured as virtual appliances. The packet capture appliances 202 are operative to capture packets off the network (using known packet capture (pcap) application programming interfaces (APIs) or other known techniques), and to provide such data (e.g., real-time log event and network flow) to the distributed database 206, where the data is stored and available for analysis by the forensics module 204 and the security intelligence console 208. A packet capture appliance operates in a session-oriented manner, capturing all packets in a flow, and indexing metadata and payloads to enable fast search-driven data exploration. The database 206 provides a forensics repository, which distributed and heterogeneous data sets comprising the information collected by the packet capture appliances. The console 208 provides a web- or cloud-accessible user interface (UI) that exposes a "Forensics" dashboard tab to facilitate an incident investigation workflow by an investigator. Using the dashboard, an investigator selects a security incident. The incident forensics module 204 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 2 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 204 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 2 is configured to collect event and flow data, and generate reports. As noted, a user (e.g., an SOC analyst) can investigate offenses to determine the root cause of a network issue.

As noted above, a "rule" is a construct that is applied to events, flows or offenses, to search for or detect anomalies. If all of the conditions are the rule are met, the rule generates a response that the solution (or some other security system or device) can then act upon. Custom rules test events, flow, and offenses to detect unusual activity in a network. Typically, new rules are created by using Boolean (AND, OR, etc.) combinations of existing rule tests. Anomaly detection rules test the results of saved flow or events searches to detect when unusual traffic patterns occur in the network. Another construct commonly used in a SIEM is a building block, which is a collection of tests that do not result in a response or an action. A building block groups commonly used tests to build complex logic so that it can be reused in rules. A building block often tests for IP addresses, privileged user names, or collections of event names. For example, a building block can include the IP addresses of all DNS servers. Rules can then use this building block. As depicted in FIG. 2, in operation event collectors gather events from local and remote sources, normalize these events, and classify them into low-level and high-level categories. A rules engine processes events and compares them against defined rules to search for anomalies. When a rule condition is met, an event processor generates an action that is defined in the rule response. Some SIEMs provide rule performance visualization that can assist a team to determine the efficiency of the existing rules in the system.

Typically, a SIEM is implemented on-premises in a computer network, and the SIEM may interoperate with systems located in a cloud environment, or in a hybrid computing environment.

Endpoint Detection and Response (XDR) Systems

Figure 3:
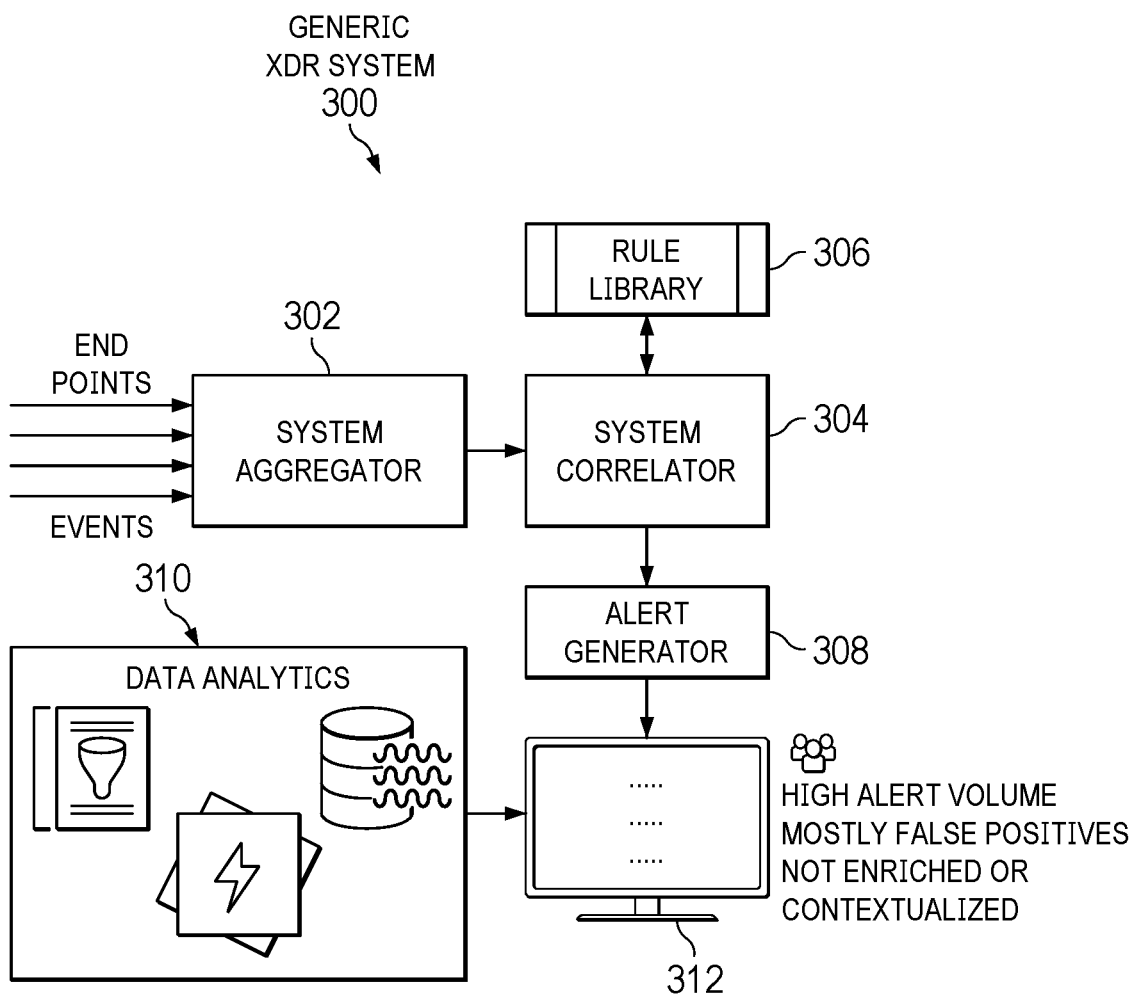
FIG. 3 depicts a representative XDR system in which the techniques of this disclosure may be implemented.

FIG. 3 depicts a representative known Endpoint Detection and Response (XDR) system 300. XDR is software designed to automatically protect an organization's end users, endpoint devices and IT assets against cyberthreats that get past antivirus software and other traditional endpoint security tools. Typically, it is deployed by a service provider as a managed service on behalf of an enterprise customer. A representative service of this type is IBM® Managed Security Services (MSS). XDR collects data continuously from all endpoints on the customer network—desktop and laptop computers, servers, mobile devices, IoT (Internet of Things) devices and more. It analyzes this data in real time for evidence of known or suspected cyberthreats, and it can respond automatically to prevent or minimize damage from threats it identifies. XDR threat detection analytics and automated response capabilities can identify and contain potential threats that penetrate the network perimeter before they can do serious damage, and these capabilities often do not require human intervention. XDR also provides tools that security teams can use to discover, investigate and prevent suspected and emerging threats on their own.

Specifically, XDR systems typically provide continuous endpoint data collection, real-time analysis and threat detection, automated threat response, threat isolation and remediation, and support for threat hunting. To this end, and as depicted, XDR system 300 typically comprises a set of components, namely, a system event aggregator 302, a system correlator 304, a rule library 306, an alert generator 308, data analytics 310, and a management console 312. The system aggregator 302 receives events from connected endpoints. An endpoint (not shown) is a networked device that runs systems management code (software) that enables management and monitoring of the endpoint by the XDR system. The endpoint typically is a data processing system. The system event aggregator continuously collects data—data on processes, performance, configuration changes, network connections, file and data downloads or transfers, end-user or device behaviors—from every endpoint device on the network. The data is stored in a central database or data lake, typically hosted in the cloud. Most XDR security solutions collect this data by installing a lightweight data collection tool, or agent, on every endpoint device; some may rely instead on capabilities in the endpoint operating system. XDR uses advanced analytics and machine learning algorithms to identify patterns indicating known threats or suspicious activity in real time, as they unfold. In general, XDR looks for two types of indicators: indicators of compromise (IOCs), which are actions or events consistent with a potential attack or breach; and indicators of attack (IOAs), which are actions or events associated with known cyberthreats or cybercriminals. To identify these indicators, and using system correlator 204, XDR correlates its own endpoint data in real time with data from threat intelligence services (not shown), which services deliver continuously updated information on new and recent cyberthreats—the tactics they use, the endpoint or IT infrastructure vulnerabilities they exploit, and more. Threat intelligence services can be proprietary (operated by the XDR provider), third-party, or community-based. In addition, many XDR solutions also map data to Mitre ATT&CK, a global knowledge base of hacker cyberthreat tactics and techniques to which the U.S. government contributes. Data analytics 310 comprise devices and algorithms that do their own sleuthing, comparing real time data to historical data and established baselines to identify suspicious activity, aberrant end-user activity, and anything that might indicate a cybersecurity incident or threat. They also can separate the 'signals,' or legitimate threats, from the 'noise' of false positives, so that security analysts can focus on the incidents that matter. XDR summarizes important data and analytic results in the central management console 312 that also serves as the solution's user interface (UI). From the console, security team members get full visibility into every endpoint and endpoint security issue, enterprise-wide, and launch investigations, threat responses and remediations involving any and all endpoints.

Automation provides XDR with a rapid response capability. In particular, and based on predefined rules in the rules library 306 set by the security team or learned over time by machine learning algorithms, the XDR solution through alert generator 308 can automatically alert security analysts to specific threats or suspicious activities. For example, alert generator 308 can automatically generate a 'track back' report that traces an incident or threat's every stop on the network, all the way back to its root cause, disconnect an endpoint device, or log an end-user off the network, halt system or endpoint processes, prevent an endpoint from executing (detonating) a malicious or suspicious file or email attachment, trigger antivirus or anti-malware software to scan other endpoints on the network for the same threat, and so forth. Once a threat is isolated, XDR provides capabilities that security analysts can use to further investigate the threat. For example, forensic analytics help security analysts pinpoint the root cause of a threat, identify the various files it impacted, and identify the vulnerability or vulnerabilities the attacker exploited enter and move around the network, gain access to authentication credentials, or perform other malicious activities. Armed with this information, analysts can use remediation tools to eliminate the threat. Remediation might involve destroying malicious files and wiping them off endpoints, restoring damaged configurations, registry settings, data and application files, applying updates or patches to eliminate vulnerabilities, and updating detection rules to prevent a recurrence.

The XDR system may include support for threat hunting (also called cyberthreat hunting). Threat hunting is a proactive security exercise in which a security analyst searches the network for as-yet unknown threats, or known threats yet to be detected or remediated by the organizations automated cybersecurity tools. Threat hunters use a variety of tactics and techniques, most of which rely on the same data sources, analytics and automation capabilities XDR uses for threat detection, response and remediation. To support threat hunting, XDR makes these capabilities available to security analysts via UI-driven or programmatic means, so they can perform ad-hoc searches data queries, correlations to threat intelligence, and other investigations. XDR tools intended specifically for threat hunting include everything from simple scripting languages (for automating common tasks) to natural language querying tools.

In a typical use case, a SIEM or XDR has associated therewith an interface that can be used to render the rank-ordering of hypotheses-related information visually, to search and retrieve relevant information from alert database, and to perform other known input and output functions with respect thereto.

Attacks/Threats

Typically, an input to a SIEM or XDR is in the form of a text-based description of a cyber-attack or, more generally, a cyber-threat. A representative input is a threat advisory. Conventionally, an advisory is synonymous with a threat report (or threat collection) and that contains text descriptions of a cyber-attack, along with a set of one or more Indicators of Compromise (IOC). A typical advisory of this type is a crafted write-up about the threat, mitigation recommendations for the customers, context about the attack, and much more, including as noted the IOCs that provide evidence of the threat in question. An IOC typically is one or more of: an IP address, a domain, a hash, a URL, a memory fragment, a registry key, an email address, and the like. More generally, the input to the affectedness scoring engine is a description that includes information on types of systems, software affected, severity of the threats to respective systems, as well as indicia whether a system or software is affected by the respective cyber-threat and, if so, to what extent. In particular, advisories typically have embedded in them a score, which is sometimes referred to herein as an on-set score, of how severe the threat is considered at the time of publication of the report. The on-set score typically is added in by security analysts, threat hunters, or the like.

In this regard, it is known that an indicator of compromise can be attributed a risk or toxicity at any point in time, and by many different techniques. Often, an IOC that is identified in an advisory is one that has been seen for the first time; as such, typically the advisory includes an "initial severity indicia" that is associated with the IOC. Typically, the advisory includes initial severity indicia that is specified as a result of a security analysis. Examples of initial severity indicia are, without limitation: one or more IP addresses that are believed to be associated with an active spear phishing campaign, one or more URLs of servers that are being used as command and control (C&C) distribution centers for a new variant of malware that is destructive, file hash matches that correspond to, say, a seemingly inoffensive video that is being shared within the company but that is infected with a computer virus, probing of a known vulnerability into a customer's network, as hackers are doing reconnaissance to determine if computers or servers have been patched, an excessively high number of requests to the servers of a company, indicative of a distributed denial of service attack, attempting to bring services down, and the like. These are merely representative examples. Typically, and when a previously-seen IOC is detected in the customer environment again, it may then be assigned a "high severity" indicia, which indicates that the IOC represents a very high risk, thereby typically warranting closer research or examination. Indeed, in the usual case the detection of an IOC with high severity is how many of the investigations in SOCs start, namely, by the detection of an indicator that has an established bad reputation. While dealing with an individual indicator of this type often is manageable, the analysis task is much more complex when the security analyst has to analyze many indicators (and their current risk severity) especially across many different customer environments, and then try to evaluate their combined impact, perhaps relative to the impact of other occurrences going on in the same environment. The technique of this disclosure addresses and solves this problem.

Establishing the Coverage of SIEM/XDR Rules for an Identified Attack or Threat

With the above as background, the techniques of this disclosure are now described. As will be seen, the approach herein typically is implemented in association with a SIEM solution (as depicted in FIG. 2) or an XDR system (such as depicted in FIG. 3) to provide automatic categorization of new/existing threats and detection rules, and automated rule coverage analysis, recommendations and reporting. The solution may be an adjunct (add-on) to the SIEM or XDR system, it may be integrated into the SIEM or XDR system, or it may be provided as a standalone system or function, e.g., as a microservice. While the techniques herein are described in association with SIEM/XDR, this is not a limitation either, as the disclosed subject matter may be implemented in association with any rules-based security system wherein it is desired to provide threat classification, rule coverage analysis, and the like. Further, there is no requirement that the solution herein be implemented in association with the commercial products, systems and services identified above.

As will be described, the system uses a combination of automated rule creation and classification, threat classification, coverage analysis, recommendations and reporting, and model retraining, with a goal of enabling determination (e.g., automatically, or by a security operations team) whether existing rules provide adequate coverage for a newly-detected threat or attack. To this end, and with reference now to FIG. 4, the techniques herein provide an automated method and system 400 to assess and provide traceability and context in response to a newly-identified attack or alert, e.g., in association with a SIEM system, an XDR system, or other security system. The basic approach involves the four (4) functions depicted. To this end, the system 400 includes a processing pipeline comprising a rule creation and classification module 402, a threat classification module 404, a coverage detection and recommendations module 406, and a feedback and retraining module 408. This nomenclature is not intended to be limiting, and various of the functions and operations described below may be real-located, shared (e.g., modules 406 and 408), or otherwise. Each of these modules are now described below in detail.

The rule creation and classification module 402 typically operates in advance of identification of a new threat to auto-generate classification tags for existing rulesets. In particular, the module 402 takes, as input, rule statements, notes, documentation and other information about existing rules, and in response auto-generates an rule set that is annotated (or, more generally associated) with tags. A tag or label (or, more generally, a text field in a data set) is a descriptor that is used to categorize the rule, preferably in a hierarchical manner. Preferably, the rule creation and classification module 402 utilizes Natural Language Processing (NLP) for this purpose, and a given hierarchy for a given rule may have zero or more hierarchical levels. Together, the various hierarchical levels comprise a classification (categorization) schema. During the tag generation process, the module 402 is configured to expose to a user (e.g., via an interactive display interface) the auto-generated tags for a given rule. Using this interface, the user can enter information, e.g., to review, accept, decline or update the auto-generated tag set. The interface may also be configured to enable the user to add their own tags from a pre-configured or defined list, and/or to allow the user to define their own custom tags. The particular format (grammar, syntax, and content) for a tag set may vary depending on implementation. As an example, the following are auto-generated tags (with the colon acting to separate the hierarchical groups), and each identified description being a category (or subcategory):

"MITRE:Credential Access:Forge Web Credentials"
"Malware:Ransomware:Crypto"
"PCI: Unencrypted Transaction"

Example custom tags may be of the following form:
"Custom:Company Policy:Unallowed Website"
"Custom:Baseline:Increased CPU Usage."

Of course, the above examples are not intended to be limited. Further, it is not required that a multi-level hierarchy be defined for each rule, although this will be a typical implementation.

Figure 5:
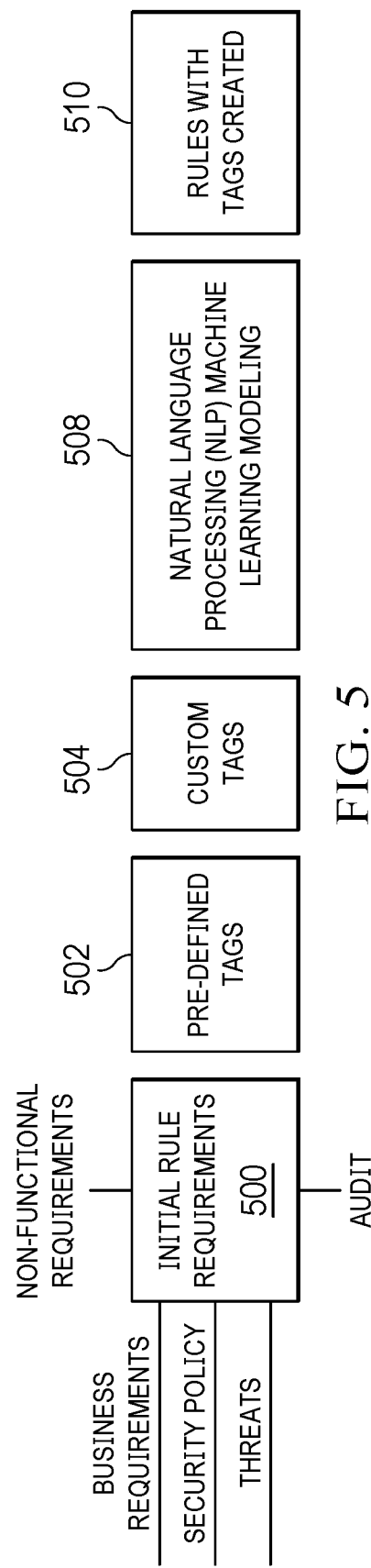
FIG. 5 depicts an operation of a rule creation and classification module of the processing pipeline.

FIG. 5 depicts a representative automated process flow for the rule creation and classification module 402. As depicted, a set of initial rule requirements are received as indicated at block 500. These include, without limitation, one or more of: non-functional requirements, business requirements, security policy, threat data, and audit data. The module also receives a set of pre-defined tags 502 (such as depicted above), as well as a set of custom tags 504. Together with existing threat report data, these tag sets are then applied to facilitate training of an NLP machine learning (ML) model 508. Preferably, the model comprises a supervised multi-label classifier that generates rules with created tags 510. A model of this type classifies a document (in this case, a threat or attack report) into pre-defined classes and gives it labels representing assigned classes. A set of classes into which the documents are classified is defined by providing training data, which is a set of documents having correct labels. The document classification predicts types, topics, or user-defined categories of a document, based on a set of parameters trained with user-provided training data. A representative off-the-shelf classifier of this type is IBM Watson™ Explorer. The notion of supervised means that this classifier uses supervised learning, a type of machine learning method that requires training data to learn how to recognize classes of documents based on their metadata and keywords in text. Multi-labeling means that the classifier may give zero or more labels to a single document. A representative NLP technology that may be used is the Watson Natural Language Processing Library, which provides for an Ensemble classifier that combines different classification algorithms and majority voting. In that system, text classification algorithms are provided from several different families, namely, classic machine learning using Support Vector Machines (SVM), deep learning using Convolutional Neural Networks (CNN), and transformer-based algorithms using the BERT multi-lingual model.

Generalizing, and in a representative implementation, the training data is prepared. To this end, a set of documents (threat reports) with correct class labels typically provided by human annotations are prepared and ingested as a dataset. The classifier is then created (e.g., using Watson NLP off-the-shelf libraries as described above) and trained using the training data; the accuracy of the multi-learning is then evaluated. If the trained model is deemed acceptable, it is deployed as a classifier instance to annotate labels to new documents (in this case, new threat or attack reports from one or more threat feeds). This completes the basic description of the operation of the creation and classification module 402.

Figure 4:
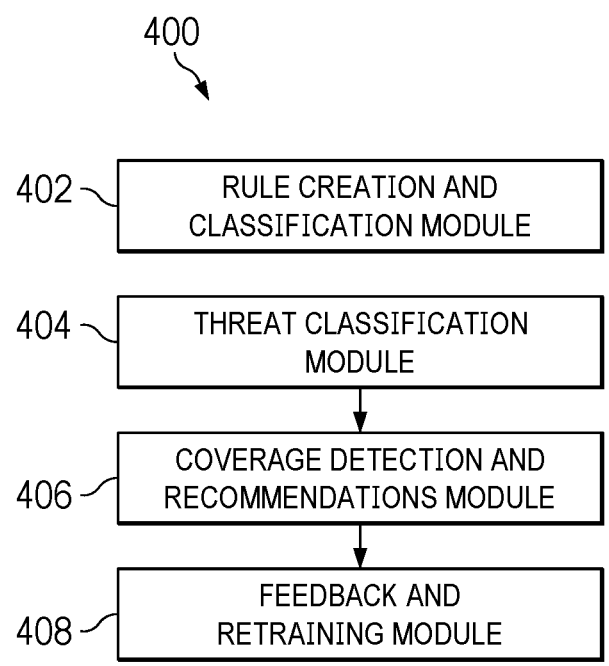
FIG. 4 depicts a processing pipeline for automated threat classification and coverage analysis according to this disclosure.
Figure 6:
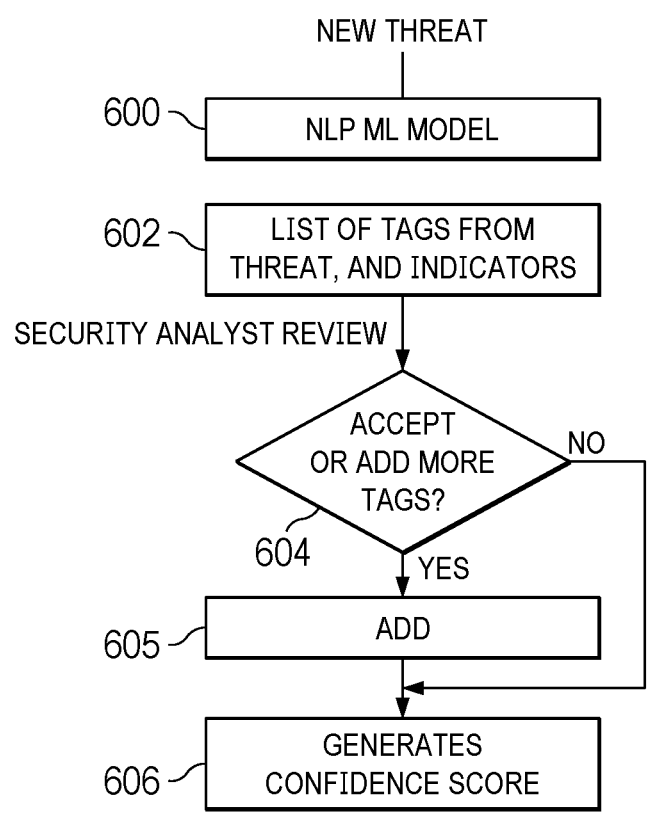
FIG. 6 depicts an operation of a threat classification module of the processing pipeline.

Referring now back to FIG. 4, the threat classification module 404 is now described. This module is configured to automatically generate multiple hierarchical tags for threats. In a representative embodiment, the threats are received from one or more threat feeds. The threat feeds include, e.g., threat descriptions, advisories, security blogs, or any other description that may be analyzed by the trained NLP model. In one embodiment, threat classification by the module 404 is initiated by a SecOps team when a new threat is identified, when that team needs to generate report on an existing threat, or the like. In another embodiment, threat classification is done automatically by the module receiving a thread feed from tools such as Qualys™ VMDR or Kenna™. In the latter case, the threat classification module exposes one or more application programming interfaces (APIs) from receiving the threat data. The threat classification performed by the threat classification module 404 is carried out using the trained NLP model, which preferably also outputs any relevant IoC. FIG. 6 depicts the operation of the threat classification model in additional detail.

As shown, at block 600, the NLP model receives the new threat in the form of a security advisory, a security blog, or other threat/vulnerability data. Based on the input, and the NLP model outputs a list of tags from the threat, as well as any relevant IoCs. This is block 602. A human being (a security analyst) or automation then determines at block 604 whether to accept the tags output from the model, or to add more tags (perhaps from a custom set of tags). If the reviewing person or automation determines that additional tags are required or desired, they are then added at step 605, and then the module outputs a confidence score 606 to complete the processing. Step 606 is also reached by a negative outcome of step 604.

Figure 7:
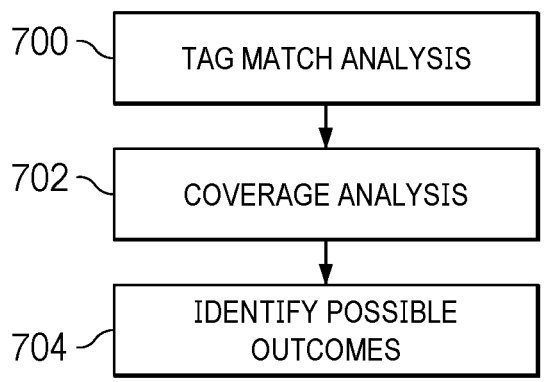
FIG. 7 depicts an operation of a coverage detection and recommendations module of the processing pipeline.

Referring back to FIG. 4, processing along the pipeline then continues with the coverage detection and recommendations module 406. This module functions to provide a coverage analysis, i.e., a comparison of the tag set generated during the inferencing process (FIG. 6) with the tags available from a current ruleset (e.g., from a SIEM). The notion here is that the system is testing the adequacy of the existing ruleset coverage, as such coverage may be sufficient to handle the newly-identified threat. To this end, and as depicted in FIG. 7 in additional detail, the coverage detection and recommendations module performs an initial nomenclature analysis 700 of the inference-generated tag set with the tag set(s) in the existing rulesets. This analysis includes identifying "full" matches as well as "partial" matches. By way of example, a new threat tagged (by the NLP model) with the tag set "Phishing:Attachment" would be deemed by the analysis to be a partial match with a prior tag set "Phishing:Link" but a full match for a prior rule already tagged with "Phishing:Attachment." At step 702, and based on the comparison of the generated tag set against the existing tag sets, in one embodiment the module identifies a set of existing rules that provide the best existing coverage (for the new threat), as well as calculated coverage percentage. Of course, and depending on the novelty of the threat, there may not be a set of existing rules that provide an adequate coverage, and this situation may be indicated by either a lack of existing rules identified, or a sufficiently low coverage percentage, or both. The operation at step 702 analyzes the matching set of rules (full and partial matches) to determine if they can detect the threat as is, or if any updates are needed. To this end, and dependent on the outcome of the analysis, operation 704 provides one or more outputs, such as information that identify any gaps where new rules should be created to increase the coverage, information about one or more update recommendations (e.g., new rules), or the like. Typically, these outputs are provided via an interface to the feedback and retraining module 408, which provides the information to a user or other system. As a concrete example, if a rule is looking for a specific set of indicators of compromise, the list of indicators that the rule is looking for is compared to the new threat indicators. For example, assume that the SIEM contains a rule tagged with ransomware:ryuk and checks for a list of hash values (IoCs) associated with Ryuk malware. Assume further that the new threat is a variant of Ryuk malware and has a new hash value, and that the threat repot is tagged with malware:ryuk:variant_name. In this example, the module identifies the applicable rule to detect Ryuk malware based on the tags and then reports that the rule needs to be updated to also look for the new variant hashes.

Figure 8:
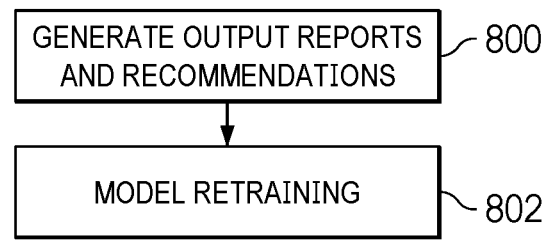
FIG. 8 depicts an operation of a reporting and retraining module of the processing pipeline.

Referring now back to FIG. 4 once again, the operation of the feedback and retraining module 408 is described. The particular operations of this module are depicted in FIG. 8. As mentioned above, this module generates one or more reports and recommendations.

Thus, for example, an output report generator 800 outputs one or more of the following: the set of rules that are matches for detecting the new threat, along with the coverage percentage based on the full/partial matches of their combined set of tags; for each selected rule, a notes fields describing the rule and its history; for each selected rule, whether it can detect the threat as is, or whether any changes are recommended, along with a confidence and coverage rating; any recommended changes for each selected rule that the system has determined will increase its coverage of the threat; new rule recommendations when no complete set of adequate existing rules can be found to cover the threat fully; and specific reports on coverage for audit and compliance requirements (such as PCI). A model retraining function 802 is used to automatically retrain the NLP model. Preferably, the retraining function 802 operates based on a set of automatically-collected feedback. This feedback includes, without limitation, information about when a user dismisses or accepts auto-suggested tags for the rules; information about when a user creates their own custom tags for rules or threats; information about when a user dismisses or accepts auto-suggested tags for a new threat report; information about when a user dismisses or accepts auto-discovered indicator on threat reports; and information about when a user dismisses or accepts newly-suggested rules or rule updates. The model retraining function 802 provides an optimization by enabling the system to become more finely-tuned as it is used in practice.

Once a new threat has been processed through the processing pipeline, a set of rules in the SIEM/XDR are then maintained, modified, adjusted, replaced or superseded, supplemented or otherwise updated as necessary, and an appropriate response to detection of the threat then proceeds in a manner dependent on the security system implementation. Thus, for example, and the in case of SIEM-based implementation, when one or more rules associated with the new threat (and as configured by the techniques of this disclosure) are then satisfied, a response to the threat is executed using the native SIEM mitigation, notification, alerting or other such systems.

Thus, according to this disclosure, when a new attack or threat is identified, the description of the threat is processed by the NLP model to identify the type of tactics, techniques and procedures used in that attack, and the model generates a list of applicable classification/categorization tags. Preferably, any available IoCs for the attack also are extracted from the threat description, and they are provided as additional input into the system along with the tags. By comparing the generated tags with tag sets associated with the existing rules in the system, the system determines the list of applicable rules that can detect the new threat. Preferably, and based on matching tags, the system also generates an estimate of coverage from the existing rules, optionally a list of rules that can be used together to increase the coverage, as well as recommendations to update or add new rules to increase the coverage. Where coverage is found to be lacking, the IoCs extracted from the threat description are used to generate the new rules.

Example Use Cases and Rules

The following provides an example of the operation of the system, e.g. for known ransomware such as Locky. Assume that a new security advisory is published for a new variant of Locky (named variantB) that is just identified, and that it can be detected with the existence of a file on a filesystem of interest with the hash "hash1." The rule creation and classification module processes the advisory document and generates the tags malware:ransomware:locky:variantB and the IoC (the hash "hash1") to detect the threat. The threat classification and coverage detection modules then examine all the existing rule tags for a match to malware:ransomware:locky:variantB, and the system then decides how to proceed based the matches (if any). Some examples of possible outcomes are as follows.

In a first possible outcome, the system finds an exact match for tag and reports that the threat is already covered.

A second possible outcome is that the system does not find an exact match for the tag but, say, finds a partial match "malware:ransomware:locky:variantA" that has the following content: file.hash.md5="hash2." In this example, the system then recommends to add a new rule, and to tag it with: "malware:ransomware:locky:variantB": file.hash.md5=hash1."

A third possible outcome is that the system does not find an exact match for the tag but finds a partial match for "malware:ransomware:locky" that has the following content: file.hash.md5="hash2." The system then recommends to modify the existing rule as follows: file.hash.md5="hash2" OR file.hash.md5="hash1."

A fourth possible outcome is that the system does not find an exact match for the tag but finds a partial match for "malware:ransomware:locky" that has the following content: file.hash.md5="hash2" OR file.hash.md5="hash1". In this case, the system reports the threat is already covered and no rule updates are needed.

Still another possible outcome is that the system does not find any matches, not even partial ones. The system then recommends to add a new rule and tag it with "malware:ransomware:locky:variantB: file.hash.md5=hash1."

The above examples are not intended to be limiting, and there may be other outcomes depending on the information detected and the set of rules and tags in the system.

The techniques herein have significant advantages. The approach enables the system to automatically categorize a new/existing threat, e.g., into multiple hierarchical categories using its documentation (e.g., to generate one or more multi-tags to describe the categories). It enables the system to automatically categorize security detection rules, e.g., into multiple hierarchical categories using their rule statements and associated documentation (e.g., to generate one or more multi-level tags to describe the categories). Using the above-described techniques, and when a new threat is identified, the system automatically calculates a percent (of existing) coverage for a threat by analyzing the multi-level tags and generating a list of groups of rules to be used (possibly together) to achieve a highest coverage. This function can also be used to generate similar reports on compliance monitoring coverage, such as for PCI, NIST, and the like, for audits. The system also advantageously generates recommendations on what new rules to add and/or what existing rules to update to increase the coverage for a given threat, e.g., using similarly-tagged rules and building blocks with partial category matches.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the above-described functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the code (e.g., the processing pipeline as depicted in FIG. 4) of this disclosure is implemented in whole or in part in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

While the techniques described herein are particularly adapted for SIEM or EDR alert handling, this is not a limitation either. The particular alert may be generated by some other security service, system, device or solution.

The techniques herein provide for improvements to another technology or technical field, namely, SIEM or EDR systems, as well as improvements to the operational capabilities of such systems when used in the manner described.

Having described the subject matter, what is claimed is as follows.

The invention claimed is:

1. A method of classifying and handling threat data in a rules-based security system that applies a set of rules to search for and detect anomalies, comprising:
for each of one or more rules in the set, generating a set of one or more first tags that categorize the rule according to a hierarchy using a natural lage processing (NLP) machine learning model;
enabling a reviewer to accept, update or add tags to the set of one or more first tags:
responsive to receipt of a new threat, determining whether the set of rules provide an acceptable coverage for the new threat by generating a set of one or more second tags with a multi-label classifier that categorize the new threat according to an attack type, and comparing the set of one or more second tags with the set of one or more first tags to generate confidence score indicating a level of coverage for the new threat;
based on the confidence score gen d by the comparison of the set of one or more second tags with the set of one or more first tags, outputting a recommendation, the recommendation including at least one selected from the group consisting of maintaining the current set of rules without change, identifying a list of groups of rules in the set of rules that should be combined to increase a percentage of coverage, identifying a new rule to be added to the set of rules, and identifying an update to at least one existing rule in the set of rules; and
adjusting the rules-based security system according to the recommendation for subsequent handling of the new threat.

2. The method as described in claim 1 wherein adjusting the rules-based security system includes one of: creating a new rule and adding the new rule to the set of rules: and identifying an existing rule for update and updating the existing rule.

3. The method as described in claim 1 wherein the confidence score identifies a percent coverage for the new threat provided by the set of rules.

4. The method as described in claim 1 wherein each of the first and second tags are generated using the natural language processing (NLP) machine learning model.

5. The method as described in claim 4 further including retraining the NLP machine learning model based at least in part on feedback collected from one or more users.

6. The method as described in claim 1 wherein comparing the set of one or more second tags with the set of one or more first tags includes identifying any partial or complete tag matches, and identifying the one or more rules of the set of rules that correspond to the partial or complete tag matches.

7. The method as described in claim 1 wherein the set of one or more first tags includes one of: tags from a predefined list, and one or more custom tags.

8. An apparatus, comprising:
a hardware processor;
computer memory holding computer program instructions executed by the hardware processor for classifying and handling threat data in a rules-based security system that applies a set of rules to search for and detect anomalies, the computer program instructions comprising program configured to:
for each of one or more rules in the set, generate a set of one or more first tags that categorize the rule according to a hierarchy using a natural language processing (NLP) machine learning model;
enable a reviewer to accept, update or add tags to the set of one or more first tags;
responsive to receipt of a new threat, determine whether the set of rules provide an acceptable coverage for the new threat by generating a set of one or more second tags with a multi-label classifier that categorize the new threat according to an attack type, and comparing the set of one or more second tags with the set of one or more first tags to generate a confidence score indicating a level of coverage for the new threat;

based on the confidence score generated by the comparison of the set of one or more second tags with the set of one or more first tags, output a recommendation, the recommendation including at least one selected from the group consisting of maintaining the current set of rules without change, identifying a list of groups of rules in the set of rules that should be combined to increase a percentage of coverage, identifying a new rule to be added to the set of rules, and identifying an update to at least one existing rule in the set of rules; and adjust the rules-based security system according to the recommendation for subsequent handling of the new threat.

9. The apparatus as described in claim 8 wherein the program code configured to adjust the rules-based security system includes program code configured to perform one of: creating a new rule and adding the new rule to the set of rules: and identifying an existing rule for update and updating the existing rule.

10. The apparatus as described in claim 8 wherein the confidence score identifies a percent coverage for the new threat provided by the set of rules, and an identification of a list of groups of the set of rules that should be combined to increase the percent coverage.

11. The apparatus as described in claim 8 wherein the program code configured to generate each of the first and second tags comprises the language processing (NLP) machine learning model.

12. The apparatus as described in claim 11 wherein the program code is further configured to retrain the NLP machine learning model based at least in part on feedback collected from one or more users.

13. The apparatus as described in claim 8 wherein the program code configured to compare the set of one or more second tags with the set of one or more first tags includes program code configured to identify any partial or complete tag matches, and to identify the one or more rules of the set of rules that correspond to the partial or complete tag matches.

14. The apparatus as described in claim 8 wherein the set of one or more first tags includes one of: tags from a pre-defined list, and one or more custom tags.

15. A computer program product in a non-transitory computer readable medium, the computer program product holding computer program instructions executed by a hardware processor for classifying and handling threat data in a rules-based security system that applies a set of rules to search for and detect anomalies, the computer program instructions comprising program configured to:

for each of one or more rules in the set, generate a set of one or more first tags that categorize the rule according to a hierarchy using a natural language p ocessing (NLP) machine earning model;

enable a reviewer to accept, update or add tags to the set of one or more first tags;

responsive to receipt of a new threat, determine whether the set of rules provide an acceptable coverage for the new threat by generating a set of one or more second tags with a multi-label classifier that categorize the new threat according to an attack type, and comparing the set of one or more second tags with the set of one or more first tags to generate a confidence score indicating a level of coverage for the new threat;

based on the confidence score generated by the comparison of the set of one or more second tags with the set of one or more first tags, output a recommendation, the recommendation including at least one selected from the group consisting of maintaining the current set of rules without change, identifying a list of groups of rules in the set of rules that should be combined to increase a cen age of coverage, identifying a new nule to be added to the set of rules, and identifying an update to at least one existing rule in the set of rules; and adjust the rules-based security system according to the recommendation for subsequent handling of the new threat.

16. The computer program product as described in claim 15 wherein the program code configured to adjust the rules-based security system includes program code configured to perform one of: creating a new rule and adding the new rule to the set of rules: and identifying an existing rule for update and updating the existing rule.

17. The computer program product as described in claim 15 wherein the confidence score identifies a percent coverage for the new threat provided by the set of rules.

18. The computer program product as described in claim 15 wherein the program code configured to generate each of the first and second tags comprises the natural language processing (NLP) machine learning model.

19. The computer program product as described in claim 15 wherein the program code configured to compare the set of one or more second tags with the set of one or more first tags includes program code configured to identify any partial or complete tag matches, and to identify the one or more rules of the set of rules that correspond to the partial or complete tag matches.

20. The computer program product as described in claim 15 wherein the set of one or more first tags includes one of: tags from a pre-defined list, and one or more custom tags.

* * * * *